Figure 1:
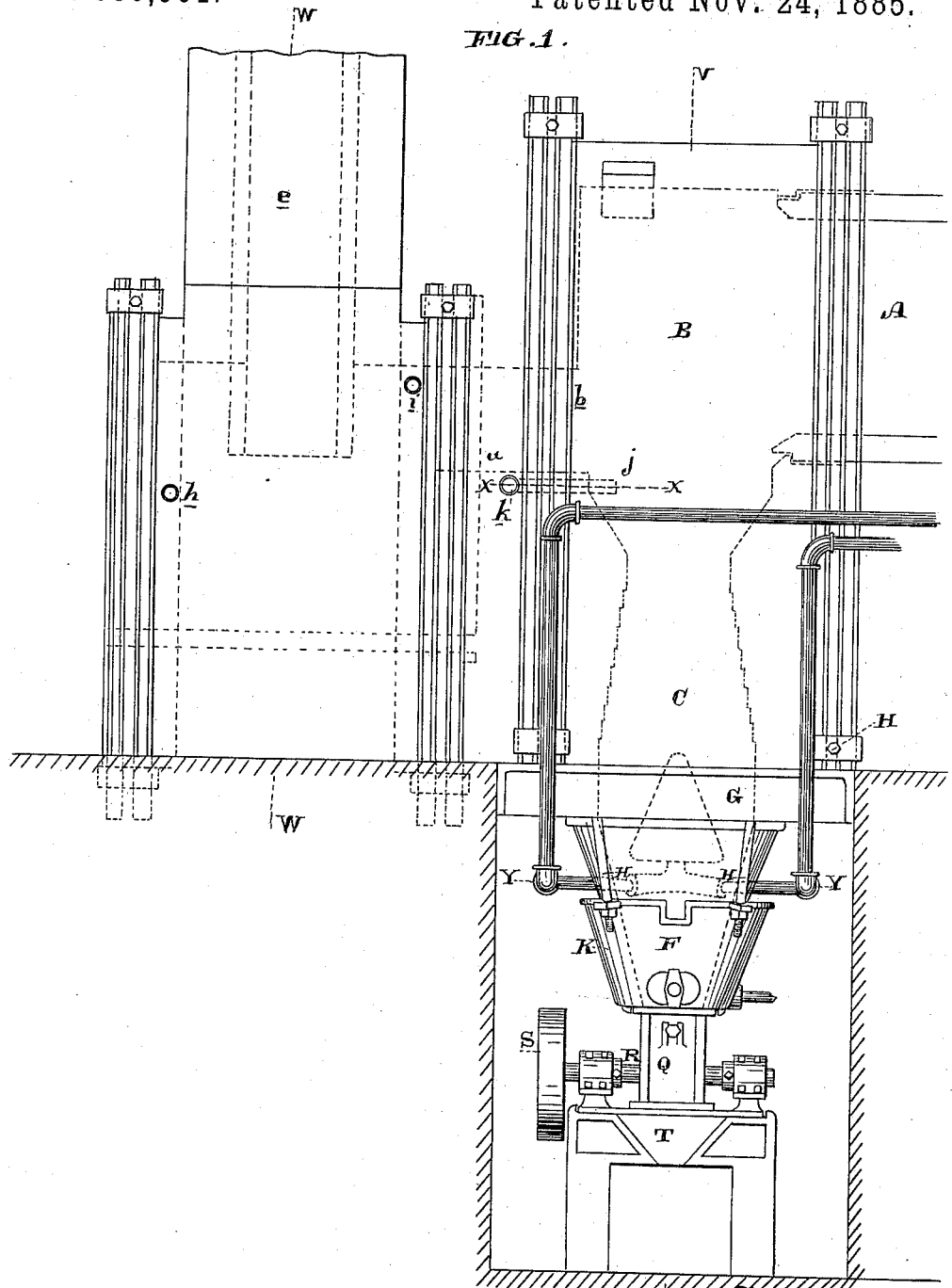

(No Model.) 3 Sheets—Sheet 1.

J. E. CLAYTON & S. F. MACKIE.
METALLURGICAL APPARATUS.

No. 330,961. Patented Nov. 24, 1885.

Witnesses,
Geo. H. Strong.

Inventors,
Joshua E. Clayton
Simon F. Mackie
By Dewey & Co.
Attorney (No Model.) 3 Sheets—Sheet 2.
J. E. CLAYTON & S. F. MACKIE.
METALLURGICAL APPARATUS.
No. 330,961. Patented Nov. 24, 1885.
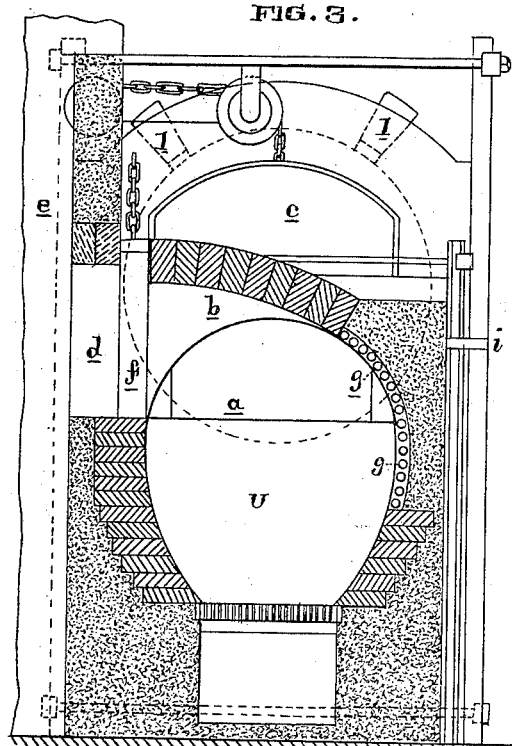
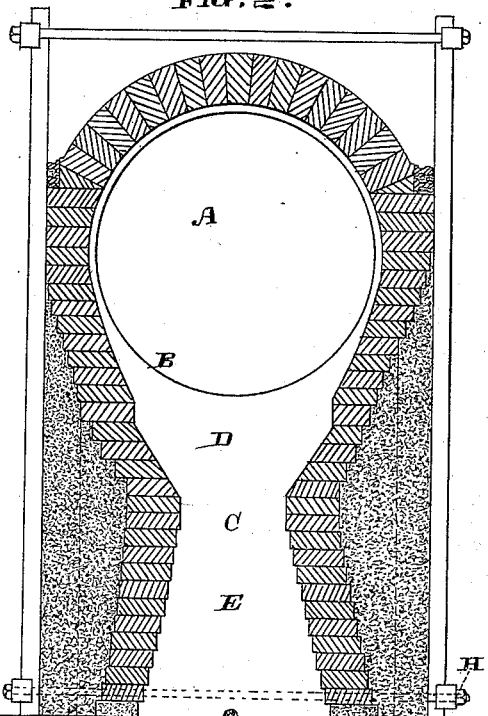
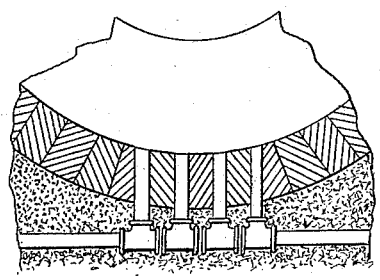
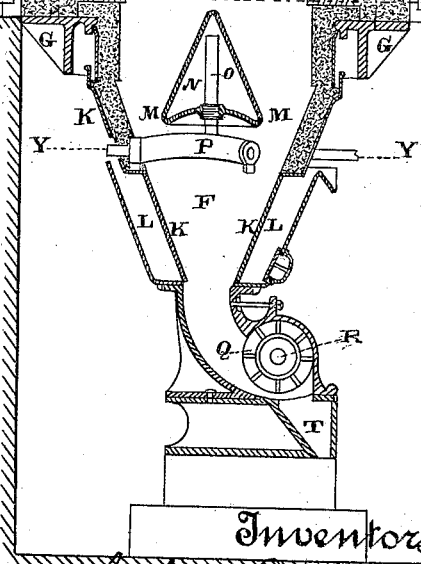

(No Model.) 3 Sheets—Sheet 3.
J. E. CLAYTON & S. F. MACKIE.
METALLURGICAL APPARATUS.
No. 330,961. Patented Nov. 24, 1885.
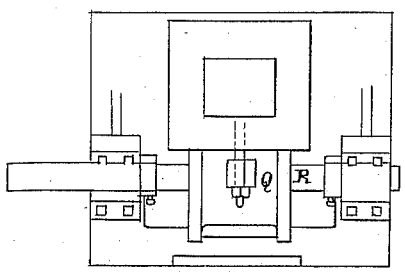
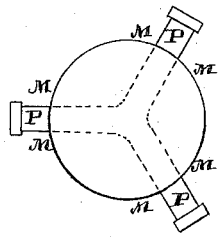
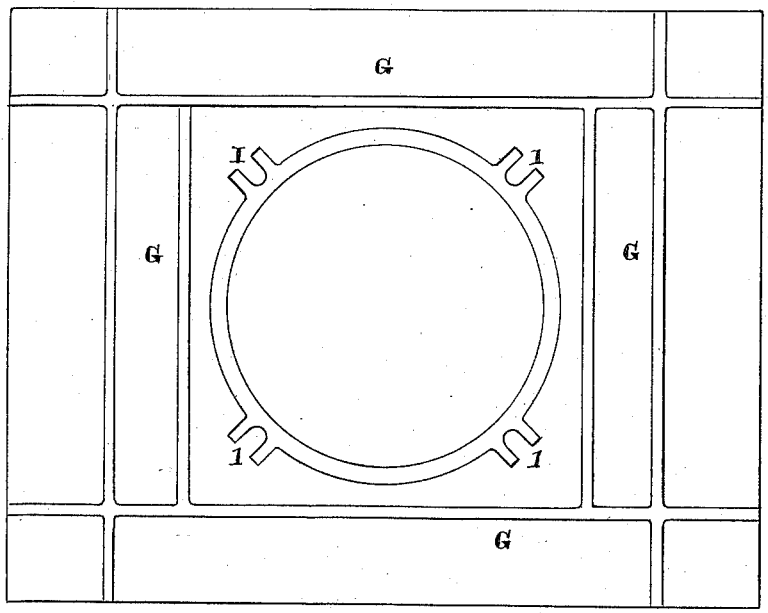
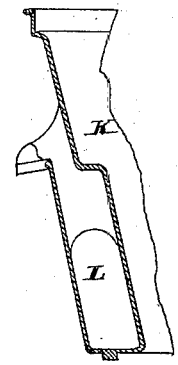
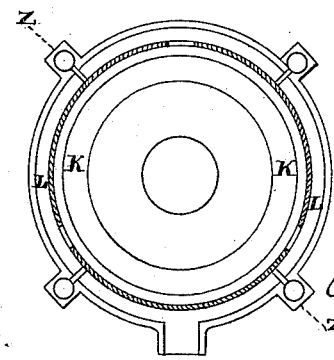
Witnesses:
Geo. H. Strong
Inventors,
Joshua E. Clayton
Simon F. Mackie
By Dewey & Co.
Attorneys

UNITED STATES PATENT OFFICE.

JOSHUA E. CLAYTON AND SIMON F. MACKIE, OF SALT LAKE CITY, UTAH TERRITORY.

METALLURGICAL APPARATUS.

SPECIFICATION forming part of Letters Patent No. 330,961, dated November 24, 1885.

Application filed July 7, 1885. Serial No. 170,913. (No model.)

*To all whom it may concern:*

Be it known that we, JOSHUA E. CLAYTON and SIMON F. MACKIE, of Salt Lake City, Salt Lake county, Utah Territory, have invented an Improvement in Metallurgical Apparatus; and we hereby declare the following to be a full, clear, and exact description of the same.

Our invention relates to certain improvements in metallurgical apparatus, which will be more fully explained by reference to the accompanying drawings, in which—

Figure 1 is a side view. Fig. 2 is a transverse section on the line V V, Fig. 1. Fig. 3 is a transverse section on the line W W, Fig. 1. Fig. 4 is a partial horizontal section on the line X X, Fig. 1. Fig. 5 is a plan of the discharge-gear. Fig. 6 is a plan of the deck-plate. Fig. 7 is a plan of the cone and blast pipes. Fig. 8 is a horizontal section on Y Y, Figs. 1 and 2. Fig. 9 is a vertical section on Z Z, Fig. 8.

A is the fire-box end or mouth of an ordinary rotating or other furnace, which discharges into a chamber, B, covering the hopper or receiving-chamber C. This hopper C is formed of three truncated conical portions. One inverted truncated cone, D, catches the roast as it comes from the mouth A of the rotator and delivers it into the truncated conical portion E, whence it passes into the lower vertical truncated portion, F. As figured, the conical portions D and E are of brick-work, and are built upon a deck-plate, G, covering a well or hole. In the well or hole is hung (by four T-bolts, H, taking into lugs I in the deck-plate G) the casting K, whose upper part is lined with fire-clay or other suitable material, while the lower part is shaped so as to form a water-jacket, L.

In the receiving-chamber C are introduced tuyeres for allowing air, gas, or vapor to be blown into the mass in the hopper. These tuyeres M (sixteen in number) are figured as holes radiating from the lower portion of the cone N, as shown in Fig. 7, which is supplied with air, &c., by the pipe O, which connects with the three radial pipes P, resting upon the casting K. These pipes P are connected with suitable air-pipes, stop-valves, &c., which, to avoid complication, are only partially indicated in the drawings. The lower portion of the casting K rests upon the box of the discharge-wheel Q, which is keyed on the axle R, this being furnished with a pulley, S, for regulating the discharge. The discharge-gear is of a well-known type, and there are many alternative gears which can be substituted for it. It empties into the hopper T. Opening into the chamber B is the fire-box U, the products of combustion from which pass over the bridge $a$ through the arch $b$ into the chamber E. The opening from the fire-box U under the arch $b$ into the chamber B can be closed by the damper $c$. From the fire-box U there is an opening, $d$, leading into the stack or chimney $e$, and closable at pleasure by the damper $f$. The side of the fire-box U contains a superheater, $g$, which is furnished with inlet and discharge pipes $h$ and $i$, attaching to suitable connecting-pipes, stop-valves, &c., which, in order to avoid complication, have not been shown in the drawings. Under the bridge $a$, and discharging into the upper part of the inverted truncated conical portion D of the receiving-chamber C, are pipes $j$, which connect with a main, $k$, furnished with suitable connecting-pipes and stop-valves. In the upper part of the chamber B are holes $l$, which can be closed by fire-bricks, plugs, valves, or dampers.

In employing this apparatus we charge, through the ordinary forms of feeding-gear, the pulp, ore, or substance to be treated, into the rotator, and this being put into rotation the pulp, ore, or substance passes down through it, and, coming into contact with the flame from the fire-box U or other warm gases and vapors generated, as hereinafter described, is heated or roasted to any desired extent, and in such roasted or heated condition empties from the mouth A of the rotator into the receiving-chamber C. When the chamber C is sufficiently full of pulp or roast, air or steam or any desirable gas or vapor at a suitable pressure is let into the pipes P and passes into the cone N, where it is slightly heated by contact with the walls, which are surrounded by hot pulp or roast, and thence through the tuyeres M into the chamber, bubbling or boiling up through the material contained therein, until it escapes into the chamber B, whence it passes out through the rotator. The air, steam, or gas, when it leaves the chamber and enters the chamber B, has the same temperature as the hot pulp, roast, or material in the chamber, and in its passage through the rotator imparts its heat to the cooler material which is fed into it. The discharge-wheel Q, being put in motion as soon as the chamber is sufficiently full, draws off the roast or pulp from the chamber continuously, so that by regulating the feed and discharge the level of the pulp or roast is maintained at any desired height in the chamber. The dampers $f$ and $c$ enable us to regulate the amount of flame which passes into the rotator, and thus control the heat therein independently of any regulation of the fire; hence we can use a hot fire in the fire-box U solely for the purpose of heating the superheater $g$, while none or any desired portion of this heat is allowed to pass into the rotator. If it be desirable to use a deep fire in the fire-box U, and for this reason sufficient air does not pass through the grate-bars for the proper combustion of the gases generated, the air necessary for combustion is supplied to the flame by opening wholly or partially the holes $l$ in the upper part of the chamber B, allowing the air to fall into and descend through the hotter and lighter flame. The supply of air for oxidizing or roasting in the rotator, or for burning any inflammable products which may be generated in the converter, is introduced under the flame from the fire-box U through the main $k$ and pipes $j$, and being cooler and heavier than the flame tends to remain below it in contact with the pulp or roast in the chamber and rotator and burn or oxidize the escaping gas, pulp, or roast. By making suitable pipe-connections with the discharge-pipes of the superheater we can pass through the superheater and heat either blast which is introduced into the cone N, and thence out through the tuyeres M into the chamber C, or the current of air which passes through the main $k$ and discharge-pipes $j$ over the mass in the chamber into the rotator, or even the air supplied through the holes $l$ in the chamber B for the combustion of the flame in the rotator, and by using more than one superheater we can heat more than one of these blasts or currents. Lastly, if we choose, we can use the pipes P and $k$ to introduce into the chamber or rotator gases other than air; or, by using more than one of the pipes P and employing one to introduce one gas or vapor, while the other introduces a different gas or vapor, we can blow into the chamber any desired mixture of gases or vapors. The skilled metallurgist would at once see that such a form of apparatus could be advantageously used for a great variety of metallurgical operations not necessary to be mentioned here; hence it will be apparent that the converter may in some cases not only suffice to accomplish a desired chemical reaction, but will also become a generator of heat which could be utilized in the rotator.

The object of our invention, as respects its primary features, is as follows: to effect a combination of the following known and existing metallurgical apparatus, to wit: a roasting or heating furnace of suitable construction with a containing vessel or chamber supplied with suitable tuyeres, for the purpose of introducing into the contained mass of material air, steam, or other gases or vapors at such pressure as will suffice to enable them to boil or be blown through said mass.

To the skilled metallurgist and engineer it will be at once apparent that there are numerous modifications of the mechanism heretofore especially described in detail which could easily be made. For example, the furnace, instead of being a rotator, as described, might be a stack roasting-furnace, like the Stetefeldt or Gerstenhoffer types, an ordinary reverberatory roasting or heating furnace, or an ordinary roasting-kiln.

The chamber might be varied in form (for example, be of the ordinary Bessemer type) and constructed of material especially adapted to a particular end in view.

The tuyeres might be differently introduced, and the principle of working might be changed from continuous to intermittent or mechanical operations superseded by manual labor.

Having thus described our invention, what we claim as new, and desire to secure by Letters Patent, is—

1. A roasting-furnace and a receiving vessel or chamber provided with and inclosing suitable tuyeres, in combination with air-pipes $j$, discharging above the mass contained in said vessel or chamber, substantially as herein described.

2. A roasting or heating furnace and a receiving vessel or chamber provided with tuyeres, in combination with a fire-box, U, having an opening, $d$, the dampers $c$ and $f$, and a chimney or stack, $e$, substantially as herein described.

3. The combination of a roasting or heating furnace, a receiving vessel or chamber, a receptacle inclosed by the chamber provided with tuyeres, and a superheater within the fire-box, substantially as herein described.

4. The combination of a heating-furnace, a receiving vessel or chamber provided with tuyeres, a fire-box containing a superheater, and a combustion chamber having air holes or valves, substantially as herein described.

5. The combination of a heating-furnace, a receiving vessel or chamber provided with radial tuyeres, a fire-box opening into a combustion-chamber above said receiving-chamber, the dampers *c* and *f*, a discharge-stack, and a continuous discharge apparatus, substantially as herein described.

6. A roasting or heating furnace and a containing vessel or chamber provided with tuyeres, into which it discharges, in combination with a fire-box, U, dampers *c* and *f*, and stack or chimney, together with the air-pipes *j*, discharging above the material in the converter, substantially as herein described.

In witness whereof we have hereunto set our hands.

JOSHUA E. CLAYTON.
SIMON F. MACKIE.

Witnesses:
CHARLES W. BENNETT,
M. KIRKPATRICK.